Patented Jan. 17, 1939

2,144,324

UNITED STATES PATENT OFFICE 2,144,324

CONDENSATION PRODUCTS OF HALOGENATED AROMATIC HYDROCARBONS WITH TRIGLYCERIDES

Albert Frank Bowles, Jersey City, and Saul Kaplan, Teaneck, N. J., assignors to The Richards Chemical Works, Incorporated, Jersey City, N. J., a corporation of New Jersey No Drawing. Application June 12, 1936, Serial No. 84,894

6 Claims. (Cl. 260—398)

This invention relates to assistants for the textile, leather and related industries and particularly to detergent, dispersing, emulsifying, foaming, leveling, penetrating, softening, stabilizing and wetting agents and their production.

Stated in general terms, our invention comprises the condensation product, sulfonated or unsulfonated, of halogenated aromatic hydrocarbons with a triglyceride of an aliphatic carboxylic acid containing at least ten carbon atoms in the molecule.

In the specification and claims the term "compound containing an hydroxyl group" is intended to include such derivatives of these compounds as the triglycerides of fatty acids, which are formed by the reaction of two compounds of the above type and are readily separated into the original compounds by hydrolysis.

Compounds which may be suitably employed for the aliphatic constituent of the condensation product are: fatty acids such as decoic, undecoic, myristic, lauric pentadecoic, palmitic, heptadecoic, oleic, stearic, ricinoleic, linolenic, linoleic, or the acid chlorides thereof; or other suitable aliphatic acids, or their chlorides, whether such acids are saturated or unsaturated, straight or branched chain.

The term halogenated aromatic hydrocarbons, as hereinabove used, includes not only compounds in which one or more atoms of a halogen, e. g. chlorine, bromine and iodine, is or are attached directly to the aromatic ring or nucleus, which may be either mono- or poly-nuclear, but also halogenated aralkyl compounds in which one or more halogens are substituted in the side (alkyl) chain thereof, as well as halogenated aralkyl compounds in which one or more halogens are substituted in the ring nucleus.

Thus, suitable halogenated aromatic hydrocarbons are benzyl chloride, mono-, di-, or trichlor xylene or toluene, alpha-chlor-naphthalene, dichlor naphthalene, any chlor dialkylnaphthalene, e. g. chlor diamylnaphthalene, chlor phenanthrene, 1-chlor anthraquinone, 1-chlor anthracene, and the like.

The condensation between the halogenated aromatic hydrocarbons and the aliphatic compound in the presence of zinc chloride is effected at any suitable temperature, e. g. above about 100° C. and usually between about 110° and about 150° C. or more.

The following examples will serve to illustrate the preparation of the condensation product although the preparation is not restricted to the examples:

Example 1

126.5 parts benzyl chloride and 200 parts of lauric acid and 5 parts zinc chloride are stirred and heated to 110° C. until the evolution of hydrogen chloride ceases and for about 1 hour thereafter.

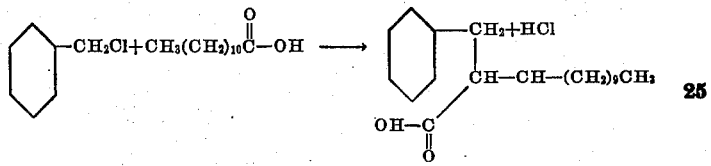

It is also possible that the condensation may take place at any other carbon atom in the chain of the aliphatic compound, as for example at the alpha or beta carbon adjacent to the carboxyl group.

In place of the lauric acid in the example, other acids, such as myristic, palmitic, stearic, oleic, ricinoleic, linoleic or linolenic acid or their triglycerides may be used. In case the glycerides are employed it is necessary to use three molecular proportions of the aryl halide compound or a di- or tri-halogen substituted aryl product.

In place of the benzyl chloride used in the above reaction, mono, di, or tri-chlor xylene, toluene or other aralkyl or aromatic halogenated hydrocarbon may be used.

Example 2

In a suitable reaction vessel there are placed 325 parts alpha-chlornaphthalene and 280 parts linoleic acid and 45 parts of ZnCl₂. The mixture is heated and stirred at 120° C. until the evolution of hydrogen chloride ceases and for one to two hours thereafter. The product is cooled and washed free from zinc chloride and freed of water in the usual manner. The reaction is:

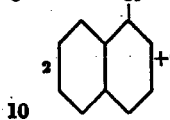

In the place of the linoleic acid used in the above reduction, other equivalent or more unsaturated aliphatic acids or any alcohol may be used, in the same molecular proportions and a correspondingly similar product obtained. Similarly, in place of the alpha-chlornaphthalene, a halogenated polynuclear aromatic or aralkyl hydrocarbon may be used, such as chlor-anthracene or chlor-phenanthrene or chlor diamylnaphthalene or isomers or homologues thereof, and which may also contain two or more substituted halogen atoms in the ring.

*Example 3*

In a suitable reaction vessel there are placed 560 parts linoleic acid and 197 parts of di-chlornaphthalene and 50 parts of zinc chloride. The mixture is stirred and heated to 130–140° C. until the evolution of hydrogen chloride ceases and for 2 hours thereafter.

The product is cooled, washed and freed of water in the usual manner, as for instance by dehydration in vacuo. The reaction proceeds in the following manner:

In place of the 1,4 dichlor naphthalene, other dihalogenated aromatic hydrocarbons may be used, and other equivalent or more unsaturated aliphatic acids, hydroxy acids or corresponding saturated or unsaturated alcohols may also replace the linoleic acid used yielding products of the same general nature and exhibiting the same general properties.

On reacting the 1,4 dichlor naphthalene with oleyl or 7 hydroxy oleyl alcohol (9-10 ethylene bond) the formula would be the same as above except that there would be a hydroxy instead of a carboxy terminal group.

The condensation products thus obtained are sulfonated and/or sulfated by treatment with such sulfonating agents as strong sulfuric acid, fuming sulfuric acid containing at least 10% sulfur trioxide, chlorsulfonic acid, aminosulfonic acid or suitable combinations thereof.

The following examples serve to illustrate the preparation of the sulfonyl compounds according to my invention, but the invention is not restricted to the examples.

*Example 4*

100 parts of a product prepared by the above described condensation in the presence of zinc chloride between 126.5 parts benzyl chloride and 200 parts lauric acid are placed in a suitable reaction vessel and stirred and cooled to about 15° to 30° C. while 250 parts of sulfuric acid containing 20% $SO_3$ are added and after about an hour, during which the stirring is continued, and while maintaining the same temperature, 116 parts of chlorsulphonic acid are added. Then, after continuing the stirring for about 2 hours at this same temperature, the reacting material is heated to about 55–60° C. and until a sample is completely and clearly soluble in water. The product is then isolated in usual and known manner and converted into its alkali salts.

*Example 5*

100 parts of a product prepared by the above described condensation in the presence of zinc chloride between 126.5 parts benzyl chloride and 186 parts lauryl alcohol are placed in a suitable reaction vessel stirred and cooled to about 15° to 30° C. while stirring, 250 parts of sulfuric acid containing 20% $SO_3$ are added and after about an hour, during which the stirring is continued, and while maintaining the same temperature, the reacting material is heated to about 55–60° until a sample is completely and clearly soluble in water. The product is then isolated in usual and known manner and converted into its alkali salts.

In place of the benzyl chloride used in Examples 4 and 5, other aralkyl halides, such as tolyl chloride or xylyl chloride, may be used, or aromatic halides such as chlor-benzene, -phenol, -cresol, -naphthalene or their substitution products or isomers or homologues.

The sulfation and sulfonation products obtained in accordance with reactions of the type referred to generally hereinabove and specifically illustrated in the various examples and their water-soluble and dispersable salts with alkalies, for example, ammonia, sodium, potassium or other metallic cations or with amines such as mono- or dialkylamines or alkylol amines, all herein and in the claims collectively referred to as "sulfuric reaction products" have an excellent wetting, cleansing and dispersing power and are therefore suitable as additions to baths for a large variety of applications in the textile and related industries, such as dyeing, bleaching, dressing, emulsifying and washing. They are also applicable for the preparation of emulsions, as dispersing agents and the like for the lacquer, leather, paper and the like industries, such as the treatment of furs, pelts, skins, etc.

While the illustrative embodiments of my invention in the above examples indicate single, pure substances only, it is understood that mixtures thereof may also be used. This includes either mixtures of the single substance, i. e. the single sulfuric reaction products independently produced and then mixed together, or mixtures produced as such. An example of the latter type of mixture may be prepared by condensing cocoanut fatty acids, obtained from cocoanut oil, with an aryl halide and then acting on the condensation product with a sulfonating agent.

While the strictly rigorous sense of the term "sulfonating" denotes introduction of a sulfonic acid group, this term throughout the specification and in the claims is employed in the sense that it is used technically in the industries to denote both sulfating (formation of an ester of sulfuric acid) and sulfonating (introduction of a sulfonic acid group).

Where an ordinary aryl halide, or aralkyl-halide is used, the hydrocarbon may be used with an alkyl halide or aliphatic acid chloride in place of the chlorination in the side chain or ring of the hydrocarbon. The alkyl halides will give alkyl ring substitutions (condensations). The acid chlorides will give ketones.

We claim:

1. A composition of matter comprising substantially the sulfuric reaction product of the condensation product of an aryl halide with a triglyceride of an aliphatic carboxylic acid containing at least 10 carbon atoms in the molecule.

2. The condensation product of an aryl halide with a triglyceride of an aliphatic carboxylic acid containing at least 10 carbon atoms in the molecule.

3. The condensation product of a triglyceride of an aliphatic carboxylic acid containing at least 10 carbon atoms in the molecule with a compound selected from the group consisting of mono-, di-, and tri-halogen substituted aromatic hydrocarbons.

4. Sulfuric acid derivative of the condensation product of a triglyceride of an aliphatic carboxylic acid containing at least 10 carbon atoms in the molecule with a compound selected from the group consisting of mono-, di-, and tri-halogen substituted aromatic hydrocarbons.

5. The condensation product of approximately one mol of a triglyceride of an aliphatic carboxylic acid containing at least 10 carbon atoms in the molecule with approximately 3 mols of an aryl halide.

6. The sulfuric acid derivative of the condensation product of approximately one mol of a triglyceride of an aliphatic carboxylic acid containing at least 10 carbon atoms in the molecule with approximately 3 mols of an aryl halide.

ALBERT FRANK BOWLES.
SAUL KAPLAN.